United States Patent [19]
Tazaki et al.

[11] 3,991,576
[45] Nov. 16, 1976

[54] FLOATING BREAKWATER

[75] Inventors: Sandanori Tazaki, Kodairo; Yozo Ishida, Kunitachi, both of Japan

[73] Assignee: Bridgestone Tire Company Limited, Tokyo, Japan

[22] Filed: Dec. 27, 1974

[21] Appl. No.: 536,783

Related U.S. Application Data
[62] Division of Ser. No. 398,368, Sept. 18, 1973.

[30] Foreign Application Priority Data
Sept. 19, 1972 Japan.............................. 47-107980
Sept. 30, 1972 Japan.............................. 47-113640
May 9, 1973 Japan................................ 48-54312

[52] U.S. Cl. ..................................................... 61/5
[51] Int. Cl.² ........................................... E02B 3/06
[58] Field of Search ................... 9/8 R; 61/1 F, 3, 4, 61/5; 114/.5 F

[56] References Cited
UNITED STATES PATENTS
| | | |
|---|---|---|
| 436,644 | 9/1890 | White ..................................... 61/5 |
| 1,933,597 | 11/1933 | McVitty.............................. 61/5 X |
| 2,658,350 | 11/1953 | Magill................................... 61/5 |
| 3,503,214 | 3/1970 | Desty et al. ........................ 61/1 F |
| 3,791,150 | 2/1974 | Tachii..................................... 61/5 |

*Primary Examiner*—Paul R. Gilliam
*Assistant Examiner*—David H. Corbon
*Attorney, Agent, or Firm*—Sughrue, Rothwell, Mion, Zinn and Macpeak

[57] ABSTRACT

A floating breakwater in which the floating body is formed by housing a floating material as a floating source and a weighting material as a source for increasing weight in a hollow shell composed of a rigid material and provided with a projection on the upper portion. The specific gravity of the floating body is made to be 0.15 – 0.75 owing to the floating material and the weighting material.

1 Claim, 16 Drawing Figures

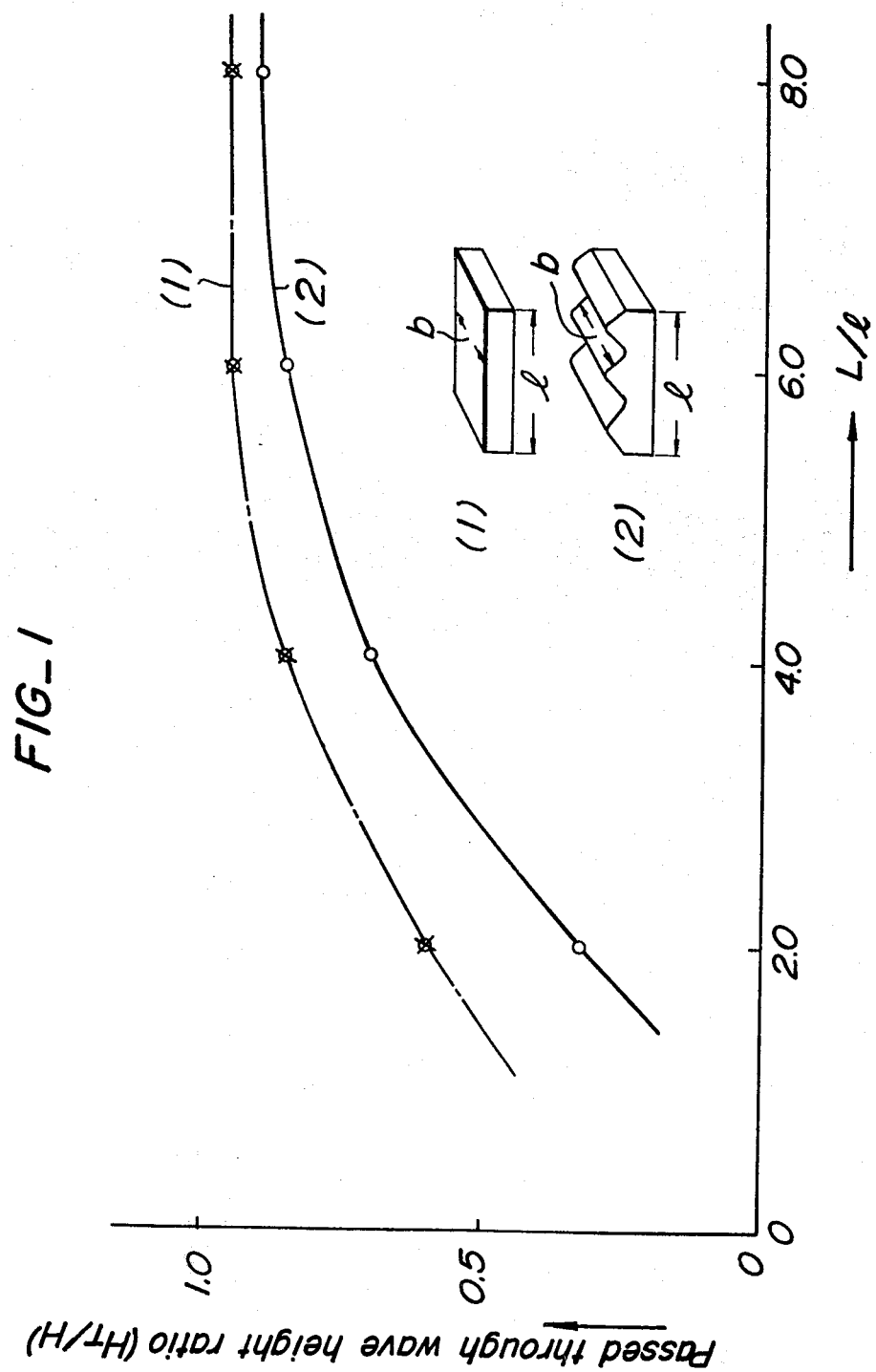
FIG_1

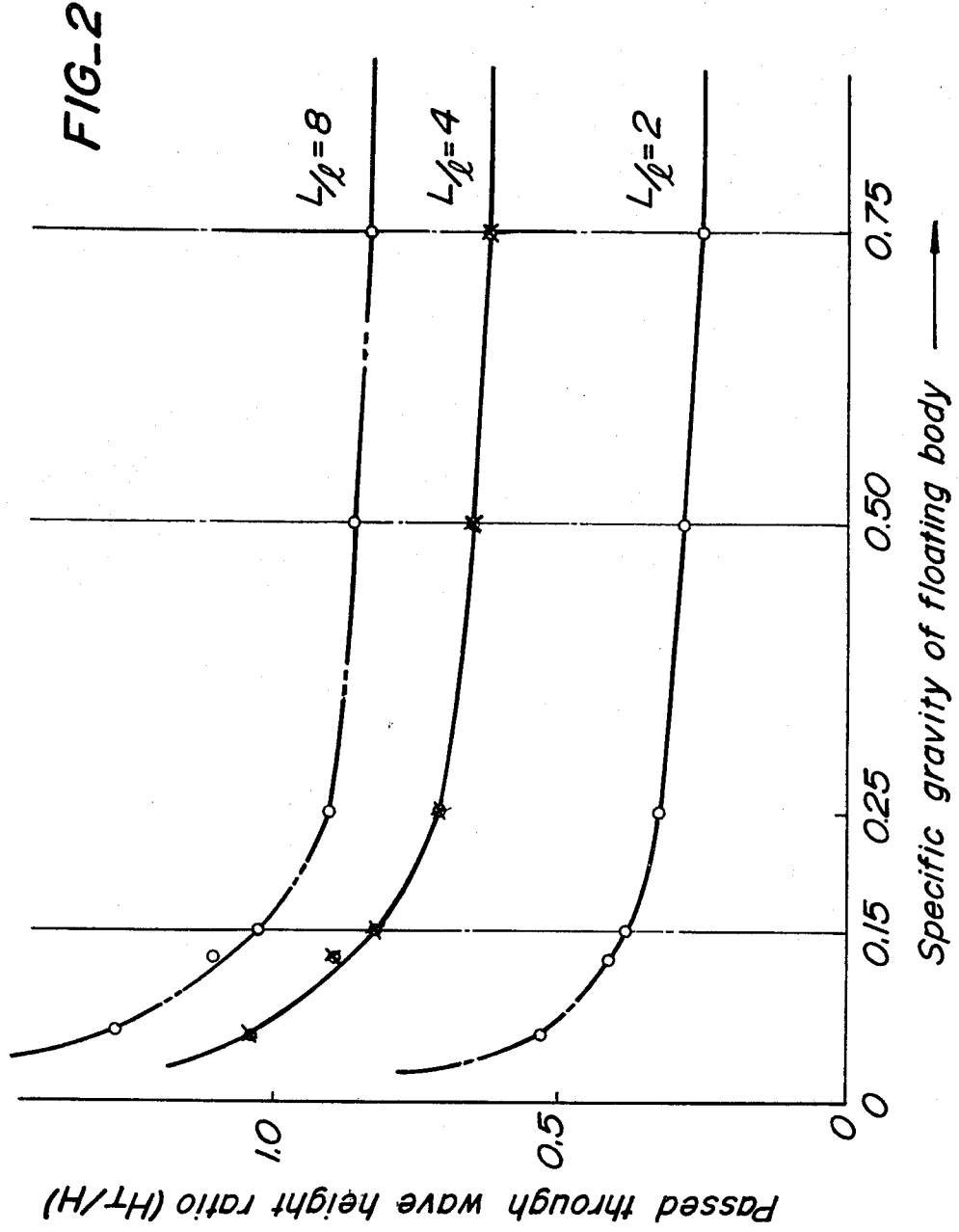

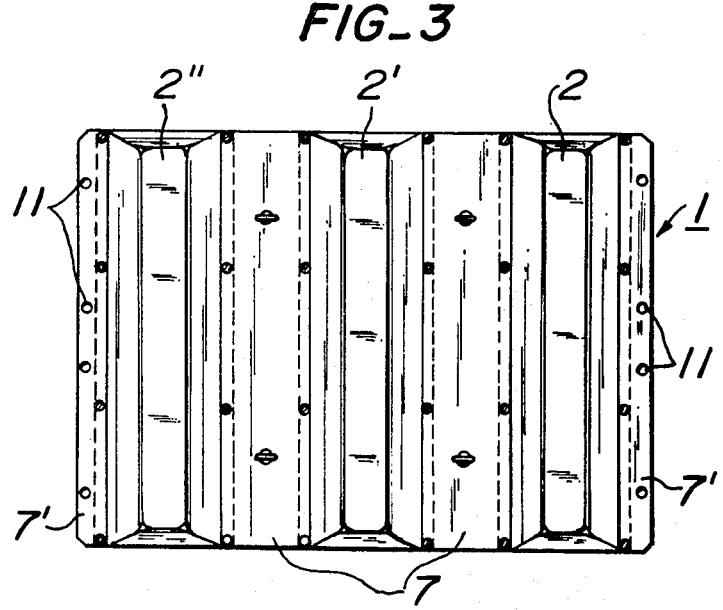
FIG_3
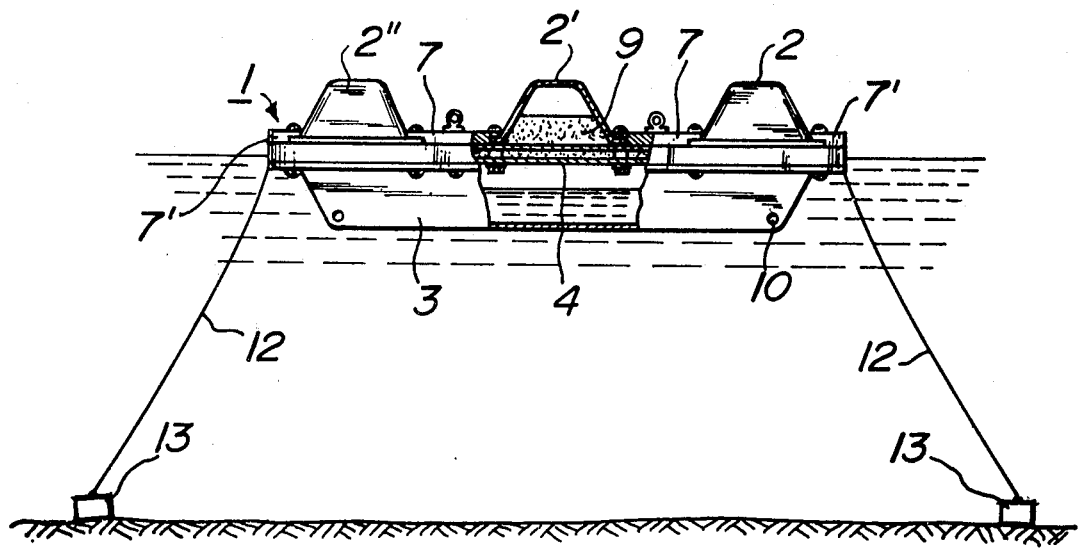
FIG_4

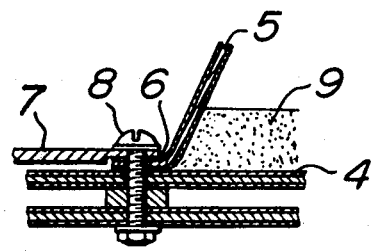
FIG_5
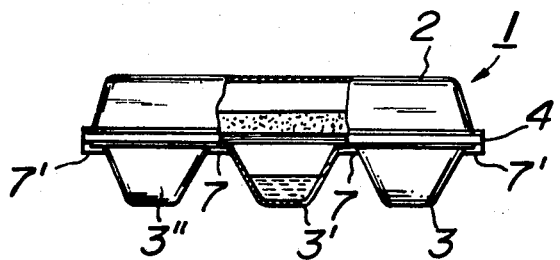
FIG_6

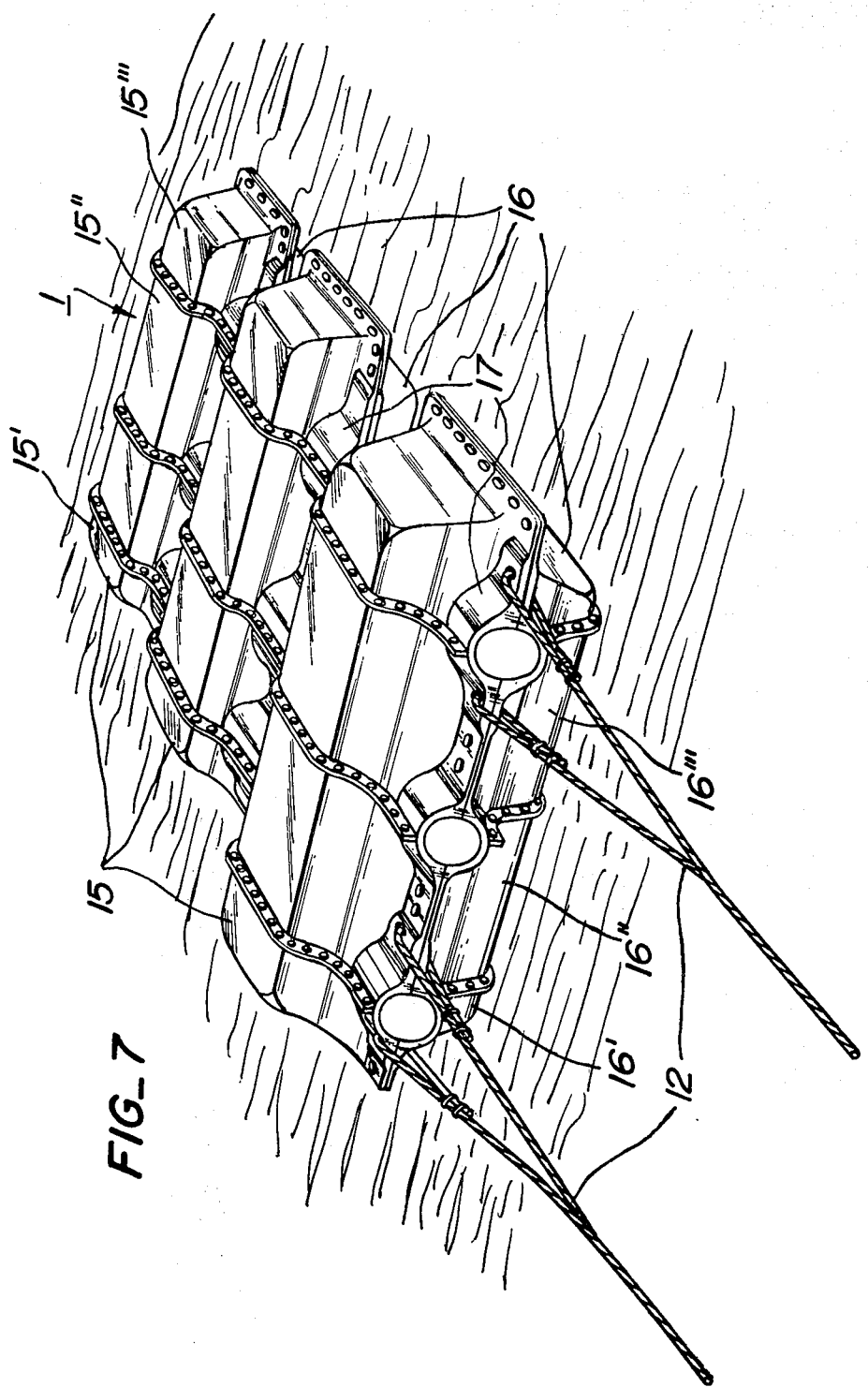

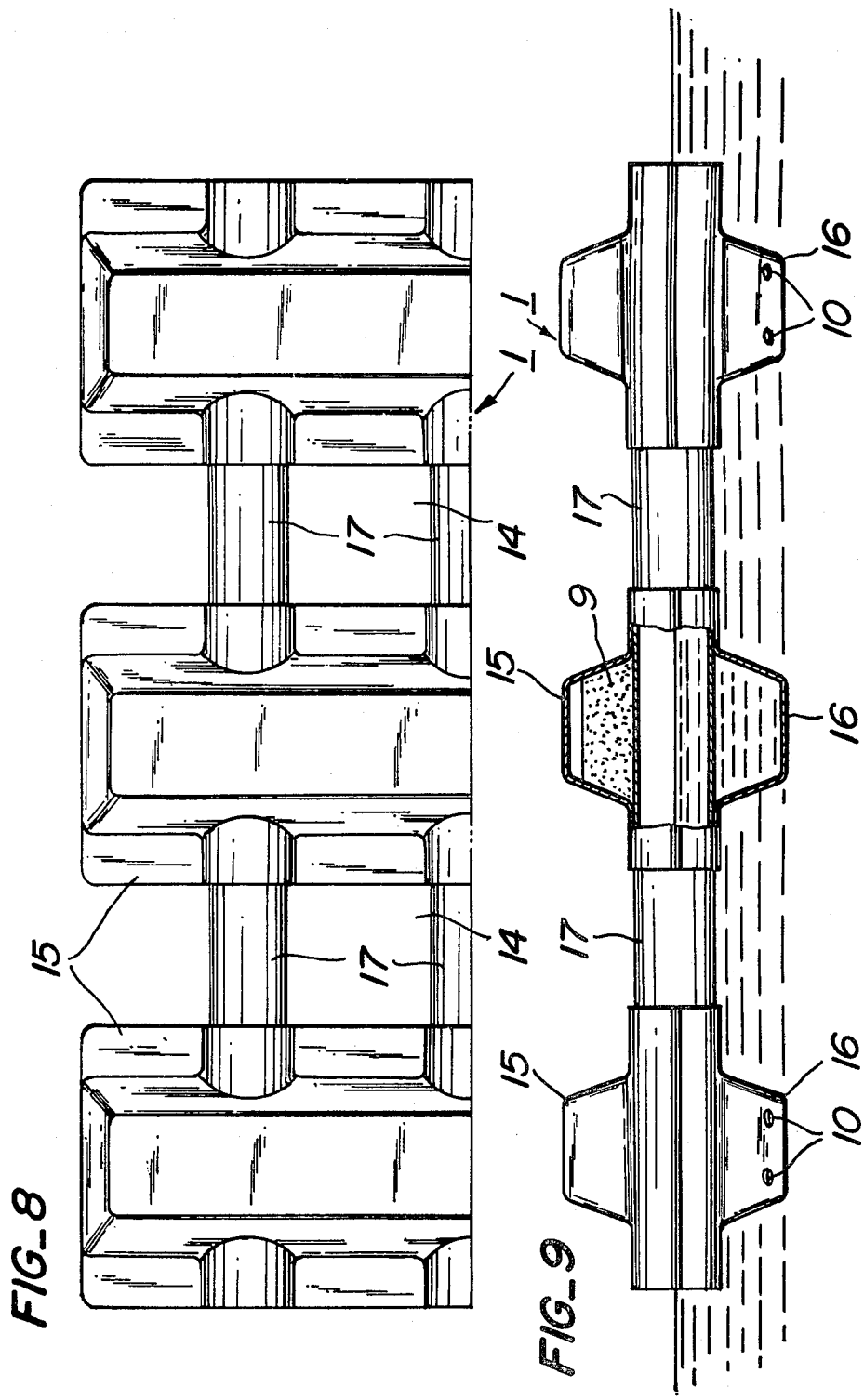

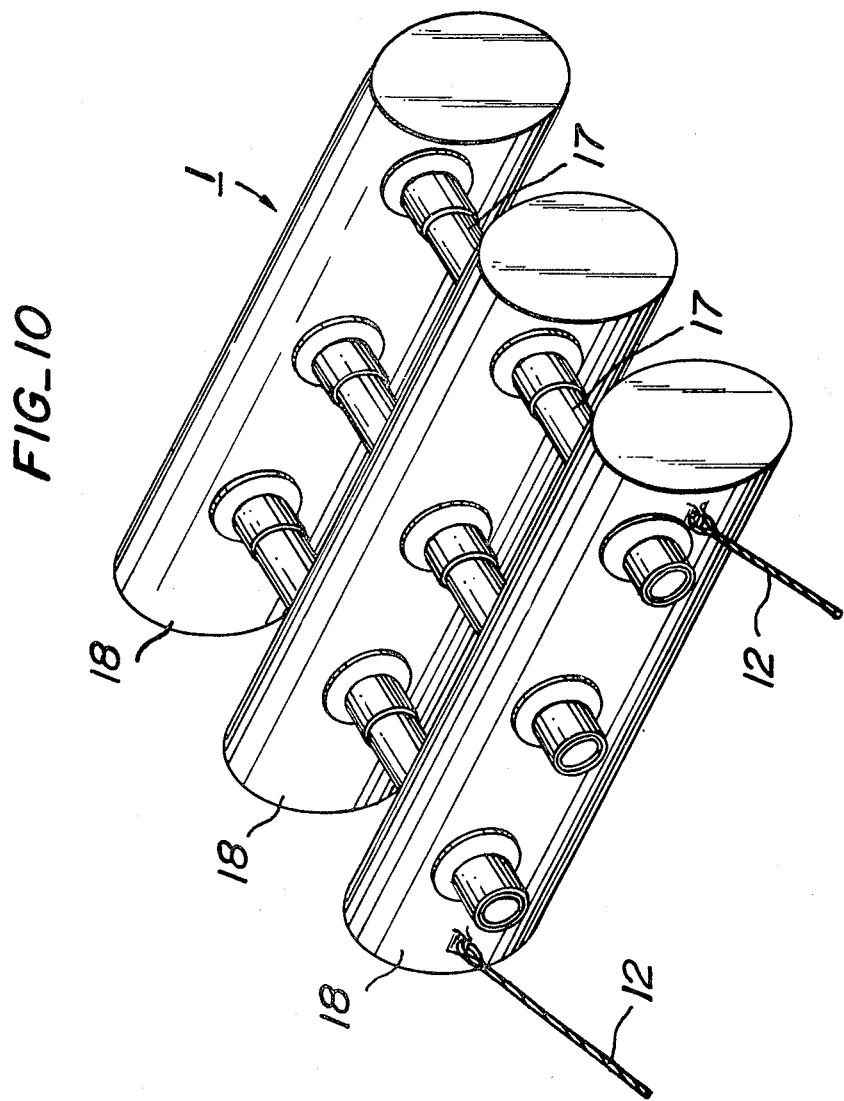

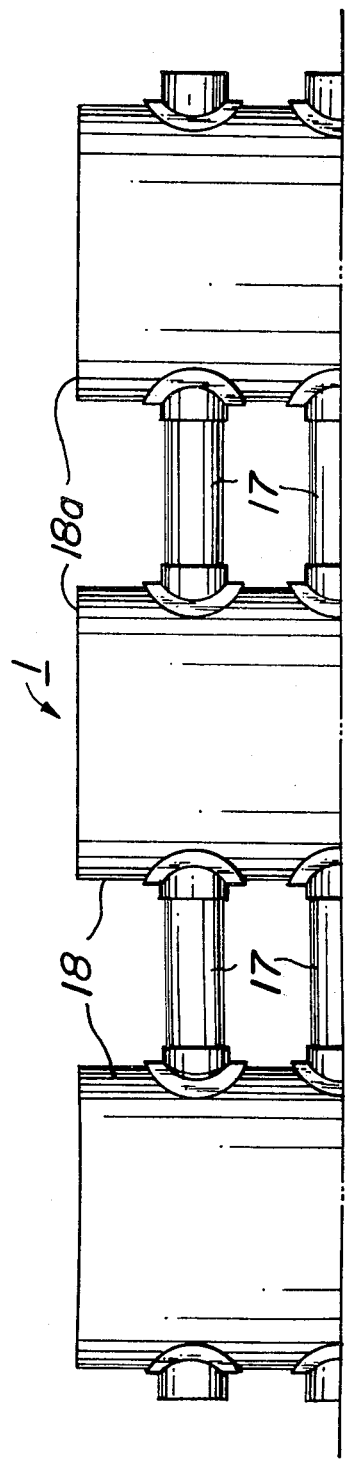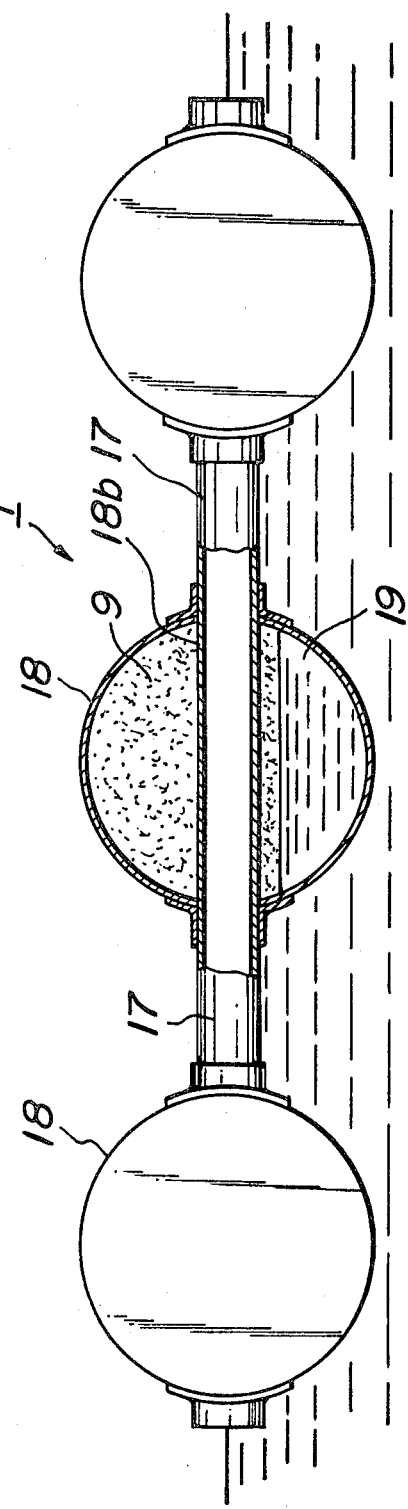

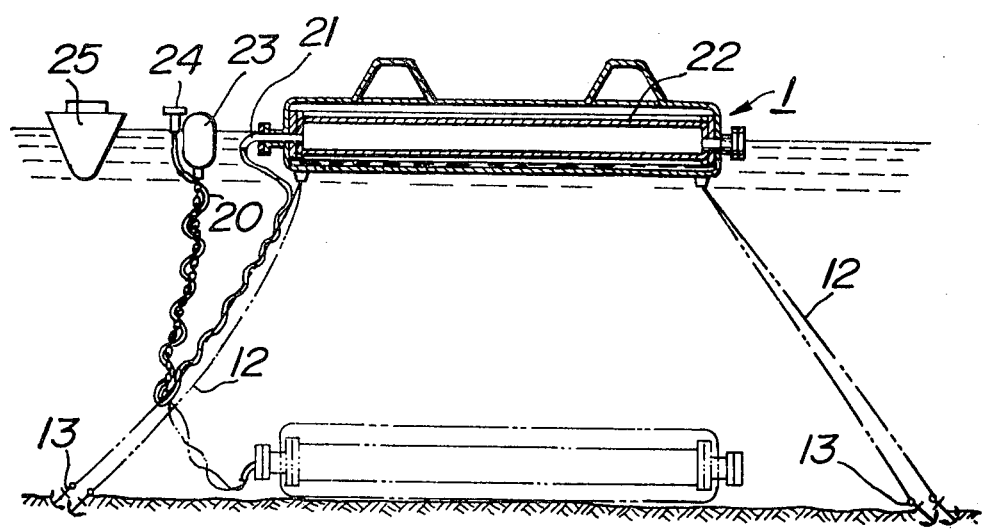
FIG_13

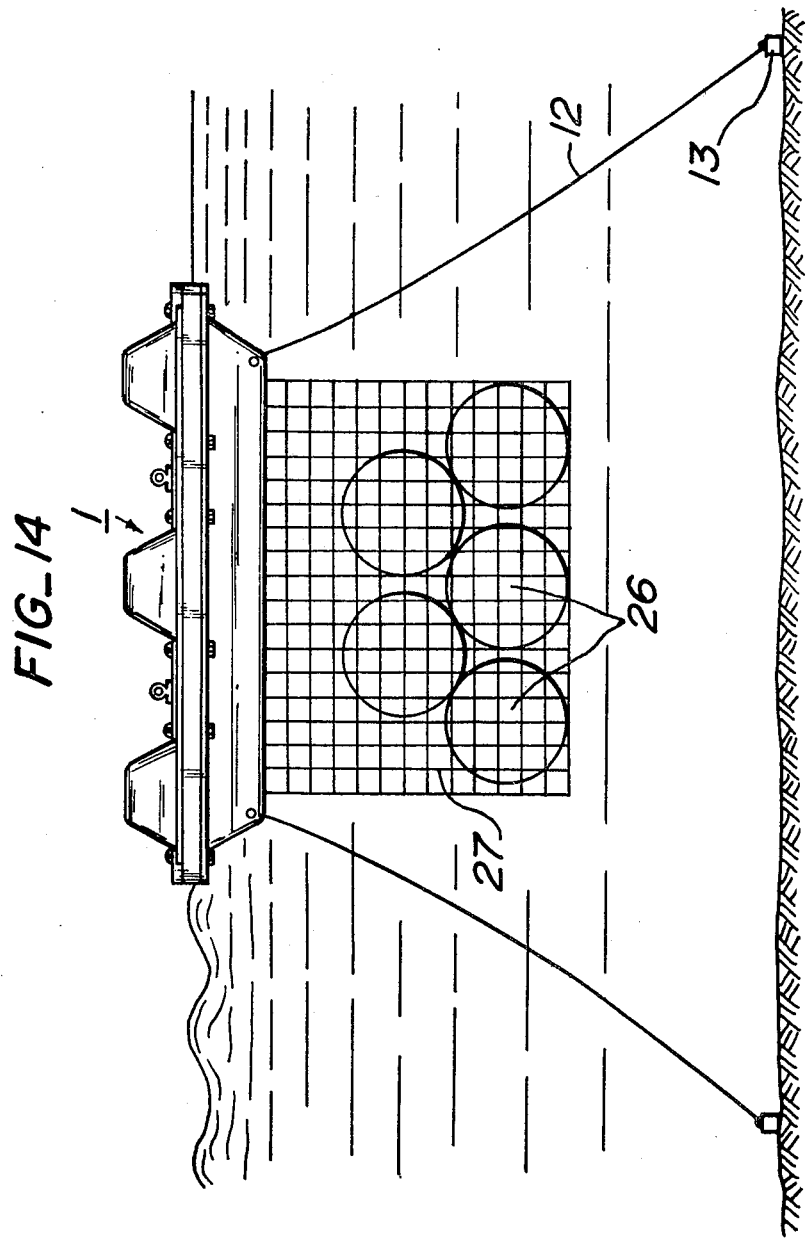

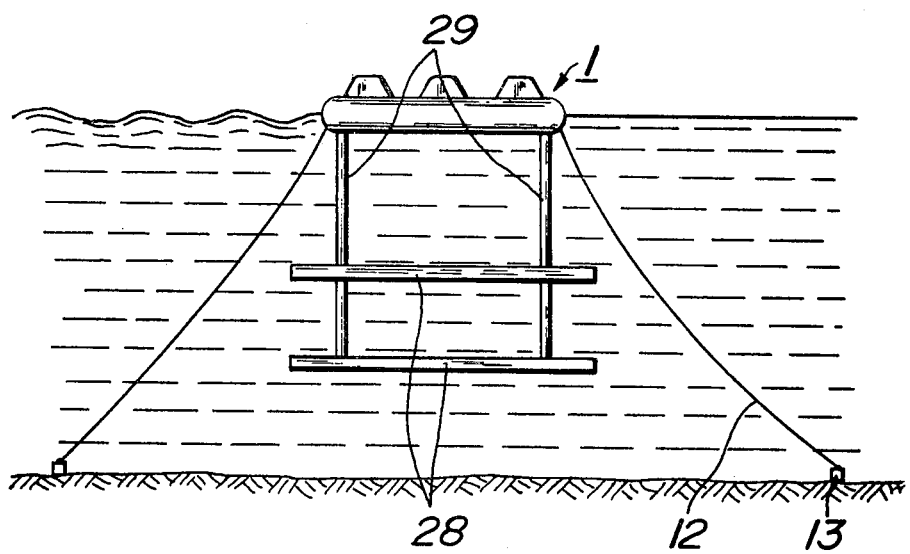

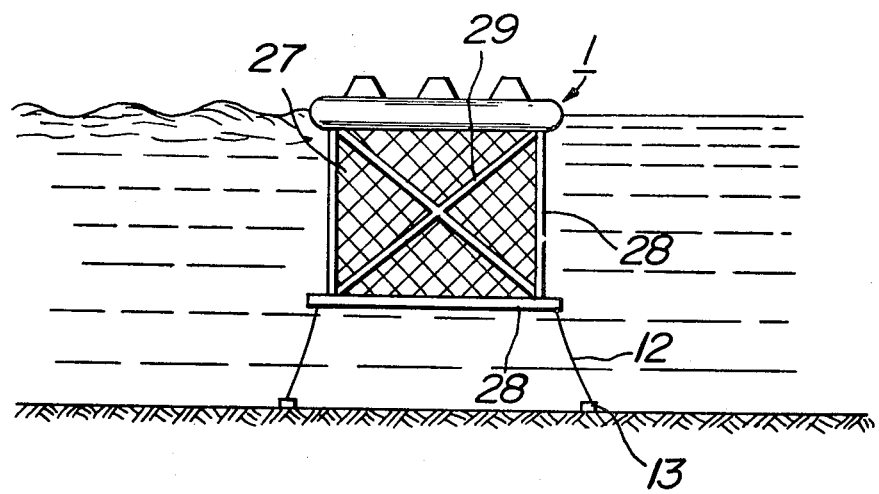

FLOATING BREAKWATER

BACKGROUND OF THE INVENTION

This is a division of application Ser. No. 398,368 filed Sept. 18, 1973 now U.S. Pat. No. 3,864,920 issued Feb. 11, 1975.

1. Field of the Invention

The present invention relates to a floating breakwater having a very high wave breaking efficiency, and which is simple, cheap and short in length.

2. Description of the Prior Art

Heretofore, various structures for breaking waves have been used in order to suppress waves formed in a sea surface, or a lake surface and recently the sea development has become important and floating breakwaters having a simple structure and an excellent effectiveness have been highly demanded.

As breakwaters, a breakwater in which a concrete wall and the like are built in sea, a submerged bank or piling up of concrete blocks, such as tetrapods has been considered to be effective but in this case, as the depth to be piled up is larger, the working becomes large and a conspicuous cost is required.

On the other hand, some means wherein floating bodies are floated on sea, have been considered but in these means, the floating bodies are merely floated on the waves and consequently when the wave length is larger than the length of the floating body, the efficiency for breaking waves is very poor. In fact, in order to make the ratio of the height of wave passed through the floating body to the height of wave before passing the floating body (abridged as "the passed through wave height ratio" hereinafter) less than 0.5, it is necessary to make the length of the floating body more than ½ of the wave length and when a wave having a long wave length and a low frequency is to be broken, it is necessary to make the length of the floating body very large and a relation of the shape of the floating body to the wave breaking efficiency has not been clearly found and the shape of the floating body has varied.

SUMMARY OF THE INVENTION

An object of the present invention is to provide a floating breakwater having a very excellent wave breaking efficiency which has a simple structure, can be provided at a low cost, and has a ratio of the height of wave passed through the floating body to the height of wave before passing the floating body of less than 0.5 in a length of the floating body of less than ½ of the wave length.

The inventors have found that the wave breaking efficiency is influenced by phase difference, reflection, friction, whirlpool action of the wave, and the like. When a floating breakwater is set on the water surface, if the floating body makes the same motion as that of wave, the wave breaking efficiency is poor and therefore in the floating breakwater according to the present invention, the specific gravity of the floating body is controlled in order to increase the wave breaking efficiency due to the phase difference to fix the floating body at a constant position near the water level as far as possible and to control the upward and downward motion against the water level effectively, and the wave breaking efficiency due to the reflection and friction is enhanced by providing a projected body on the upper side of the floating body.

The present invention relates to a floating breakwater in which the floating body is formed by housing a floating material as a floating source and a weighting material as a source for increasing weight and the specific gravity of the floating body is made to be 0.15 – 0.75 owing to the floating material and the weighting material.

The present invention comprises a built-up floating breakwater which can be easily built-up at a location to be provided and can be produced cheaply, a floating breakwater constructed with a floating body and a plane plate in which a viscosity resistance owing to water is utilized and the upward and downward motion of the floating body against the water level is restrained, a floating and submerging type breakwater provided with a tube float having an air inlet in the floating body and various improved breakwaters.

BRIEF DESCRIPTION OF THE DRAWINGS

FIG. 1 illustrates curves showing a relation of the shape of the floating body to the passed through wave height ratio;

FIG. 2 illustrates curves showing a relation of the specific gravity of the floating body to the passed through wave height ratio;

FIG. 3 is a plan view of an embodiment of floating breakwater of the present invention;

FIG. 4 is a side view showing a partial cross-section of the floating breakwater of FIG. 3;

FIG. 5 is a partial cross-section showing the connection of the projected hollow body with the substrate of the floating breakwater of FIG. 3;

FIG. 6 is a front view showing a partial cross-section of the floating breakwater of FIG. 3;

FIG. 7 is a perspective view of an embodiment of floating breakwater of the present invention;

FIG. 8 is a plan view of the embodiment of FIG. 7;

FIG. 9 is a side view showing a partial cross-section of the embodiment of FIG. 7;

FIG. 10 is a perspective view of an embodiment of floating breakwater of the present invention;

FIG. 11 is a plan view of the embodiment of FIG. 10;

FIG. 12 is a side view showing a partial cross-section of the embodiment of FIG. 10;

FIG. 13 is a cross-sectional side view of an embodiment of floating breakwater of the present invention;

FIG. 14 is a side view of an embodiment of floating breakwater of the present invention;

FIG. 15 is a side view of an embodiment of floating breakwater of the present invention; and FIG. 16 is a side view of an embodiment of floating breakwater of the present invention.

DESCRIPTION OF THE PREFERRED EMBODIMENTS

A foaming material and a weighting material are charged in a rectangular hollow floating body and a floating body, the upper surface of which is a corrugated form and both the floating bodies are determined with respect to the influence upon the wave breaking efficiency and the result is shown in FIG. 1.

Both the floating bodies have a width (b) of 350 mm and a length (l) of 500 mm. In FIG. 1, L is a wave length (unit: meter), H (unit: meter) is a height of wave before the wave passes through the floating body and HT (unit: meter) is a height of wave after passing through the floating body. The wave breaking efficiency of the floating body is shown by the passed through wave height ratio (HT/H), and the smaller the value, the higher is the wave breaking efficiency.

The inventors have made various experiments and found that the lower portion of the floating body has no relation and when a projected body is formed on the upper portion, a high wave breaking efficiency can be obtained and that when the height of the projected body is about ½ of the wave height, the wave breaking efficiency is high.

By using a hollow floating body having a projection on the upper surface and adjusting the foaming material as the floating source and a source for increasing the weight, a relation of the specific gravity of the floating body to the passed through wave height ratio is shown in FIG. 2

As seen from FIG. 2, when the specific gravity of the floating body is more than 0.15, the upward and downward motion of the floating body in the water level is prevented effectively and the wave breaking efficiency is considerably high and when the specific gravity is more than 0.75, there is no particular significance.

Accordingly, in the present invention an excellent wave breaking efficiency can be obtained by adjusting the specific gravity to 0.15 – 0.75.

One embodiment of the floating breakwaters of the present invention will be explained with reference to FIGS. 3, 4, 5 and 6. A floating body 1 is made of rigid materials, such as metal, concrete, fiberglass reinforced plastic and the like, and is composed of a projected hollow body 2, a submerged body 3 and a laminated substrate 4. The laminated substrate 4 is composed of two water resistant plates, each of which has fiberglass reinforced plastic coatings on the upper and lower surfaces, and a foamed material inserted between the plates. One or more projected hollow bodies 2, 2', 2", etc., which extend in a direction perpendicular to the direction of wave, are fixed to the upper surface of the laminated substrate 4 and one or more submerged bodies 3, 3', 3", etc., which extend in a direction perpendicular to the direction of the projected hollow bodies, are fixed to the lower surface of the laminated substrate 4. The projected hollow body and submerged body are produced by bending a water resistant plate 5 having fiberglass reinforced plastic coating on the upper and lower surfaces in the form of a gutter having a trapezoidal (FIGS. 3, 4, and 6) or semicircular cross-sectional shape. The flange 6 of the gutter is fixed to the laminated substrate 4 together with a holding plate 7 or 7' by means of bolts 8 or adhesive (not shown).

The interior of the projected hollow body is empty or filled at least partly with synthetic resin foam 9. The interior of the submerged body is empty or filled at least partly with water or with materials having a specific gravity larger than water, such as earth and sand, concrete, iron block and the like.

Alternatively, water holes 10 may be made in the wall of the submerging body so that water can enter into the submerging body when the floating body 1 is arranged in the water level.

When the floating body 1 is arranged on the water level, the body 1 is fixed by connecting rope or chain 12 to holes 11 formed in the front and rear edges of the body 1 and to anchor 13 so that the projected hollow bodies 2, 2',2", etc. extend in a direction perpendicular to the direction of wave.

The submerging bodies 3, 3', 3", etc. are fixed to the laminated substrate 4 in a direction perpendicular to the direction of the projected hollow bodies 2, 2', 2", etc. in order to reinforce the laminated substrate 4, which bonds the projected hollow bodies 2, 2', 2", etc. with each other, along the direction of wave.

The cross-sectional shapes of the projected hollow body and the submerging body may be trapezoid as shown in the figures, semicircle, rectangle, triangle and other optional shapes. However, when the height of the projected hollow body is about ½ of the wave height, a best wave breaking efficiency can be attained.

In the present invention, the specific gravity of the floating body 1, which is determined from the amount of water or the weight of filler contained as a weighting material in the interior of the submerging bodies 3, 3', 3", etc. and the volume of the projected hollow bodies 2, 2', 2", etc. or the amount of foam contained as a floating material in the projected hollow bodies 2, 2', 2", etc., is selected within the range of 0.15 – 0.75.

When the specific gravity of the floating body 1 is within the above described range, any type of floating body 1 having projections on the surface thereof can attain the object of the present invention.

FIGS. 7, 8 and 9 show another embodiment of the floating breakwaters of the present invention. In this floating breakwater, a floating body 1 is composed of a projected hollow body 15, a submerged body 16 and a bonding element 17 which bonds the bodies 15 and 16 with each other. The bonding element 17 is made into a cylindrical shape and is closed tightly at both ends. The interior of the bonding element 17 is filled with water up to about half of the volume. The interior of the bonding element 17 may be filled at least partly with materials having a specific gravity larger than water, such as earth and sand, concrete, iron block and the like.

The interior of the projected hollow body 15 is empty or filled at least partly with synthetic resin foam 9. The interior of the submerging body 16 is filled at least partly with water or with earth and sand, concrete, iron block and the like, as described in the case of the bonding element 17. When the projected hollow body 15 and the submerging body 16 are made so as to envelop the bonding element 17, the cross-sectional shapes of the bodies 15 and 16 may be trapezoid, semicircle, rectangle, triangle and other optional shapes. However, when the height of the projected hollow body 15 is about ½ of the wave height, a best wave breaking efficiency can be attained.

When the floating breakwater shown in FIGS. 7, 8 and 9 is assembled, a plurality of the projected hollow bodies 15 and a plurality of the submerged bodies 16 are bonded through a plurality of the bonding elements 17 arranged in parallel so that a plurality of the bonded bodies are arranged in parallel and are perpendicular to the direction of wave. Further, the projected hollow body 15 and the submerging body 16 may be divided into unit bodies 15', 15", 15"', etc. and 16', 16", 16"', etc. respectively. The bonding of the projected hollow body 15 with the submerging body 16, or the bonding of the unit projected hollow bodies 15', 15", 15"', etc. with unit submerging bodies 16', 16", 16"', etc. is effected by a most suitable means, such as bolts and adhesive, depending upon the properties of the projected hollow body 15, the submerging body 16 and the bonding element 17. The bonding portion of the adjacent unit bonded bodies, each of which is composed of units 15', 16', 15" and 16", etc., and the bonding portion of the bonding element 17 with the projected hollow body 15 and the submerging body 16 may be provided with seal or packing.

Furthermore, when adjacent projected hollow bodies are kept apart from each other, and a floating body 1 is assembled so as to form a space 14 as shown in FIG. 8, whirlpool of wave occurs in the space 14, and a more improved wave breaking efficiency can be attained.

In the floating breakwater shown in FIGS. 10, 11 and 12, a floating body 1 is composed of a plurality of cylindrical shells 18 arranged in parallel and a plurality of cylindrical bonding elements 17 which penetrate through the cylindrical shells 18 and bond the shells 18 with each other. The floating body 1 is arranged so that the shells 8 are arranged in parallel and are perpendicular to the direction of wave.

The cylindrical shell 18 is closed at both ends 18a. Into the interior of the cylindrical shell 18 were put a floating material 9 as a floating source of the floating body 1 and a weighting material 19 as a source for increasing the weight of the floating body 1, whereby the specific gravity of the floating body 1 is increased and the up-and-down motion of the floating body 1 on the water level is effectively controlled.

Holes are formed in the wall of the shell 18 in order to pass the bonding element 17 through the shell 18, and the shell 18 is provided with seal or packing at the bonding portion of the holes and the bonding element 17. Alternatively, the shell 18 may be provided with tubes 18b in the interior thereof in order to insert the bonding element 17 into the tubes 18b.

In the floating breakwater of the present invention, as the floating material 9 to be used as a floating source of the floating body 1, mention may be made of foams of polyurethane, polystyrene, polyethylene, polypropylene, polyamide and the like, and gases, such as air and the like. When air is used as a floating material 9, it is necessary to form a cavity in the interior of the floating body 1 or to arrange a tightly closed air room therein.

As the weighting material 19 to be used as a source for increasing the weight of the floating body 1, mention may be made of liquids, such as water and the like, earth and sand, concrete, iron block and the like.

In general, when it is intended to arrange the floating breakwater on the sea, it is often required that the floating breakwater is arranged at a position, which is a passage of ships for a certain period of time. In this case, the floating breakwater must be removed when ships pass the position. Further, if it is intended to adopt such a mooring method that the floating breakwater is floated when an extraordinary large wave is generated due to the typhoon, a very high mooring strength is required.

FIG. 13 shown an improved floating breakwater of the present invention. This floating breakwater is an up-and-down type breakwater which can be freely floated and sunk and can solve inexpensively the above described drawbacks by a very simple structure.

Referring to FIG. 13, a tubular float 22 having an air-inlet 21 connected to a compressed air source through a flexible pipe 20, one end of which always floats at a certain position on the water level, is inserted into a floating body 1. This float 22 acts as a floating element, and air is charged into or discharged from the float 22 to float or sink the floating body 1. In FIG. 13, the numeral 23 represents a buoy which serves to float always one end of the flexible tube 20 on the water level, the numeral 24 represents the cock of the flexible tube 40 and the numeral 25 represents a ship provided with a pump.

The rotary motion of wave becomes smaller according to the hyperbolic function as the depth of the wave from the water level is larger. When the rotary motion of wave under the water level is disturbed to decrease the movement of the floating body 1, the wave breaking efficiency of the floating body 1 having the above described structure and shape can be more improved.

In the floating breakwater shown in FIG. 14, the wave breaking efficiency is improved by disturbing the above described rotary motion of wave under the water level. A net bag 27 containing a plurality of solid blocks 26 having a wave breaking efficiency is hung under a floating body 1.

Since the floating breakwater of the present invention is located at a certain position near the water level, the floating breakwater has an improved wave breaking efficiency. In the floating breakwaters shown in FIGS. 15 and 16, plates 28 are fixed to a floating body 1 by means of rigid supports 29, whereby the plate 28 is subjected to a viscosity resistance due to water and the up-and-down motion of the floating body 1 against the water level is more effectively controlled.

Further, as shown in FIG. 16, when an enclosed space is formed between a floating body 1 and a plate 28, and blocks composed of metal, concrete, plastic, etc. are put into the space to disturb the rotary motion of wave under the water level, a more improved wave breaking efficiency can be attained.

We claim:
1. A floating breakwater assembly, comprising:
a plurality of parallel hollow substantially equally dimensional cylindrical shells fabricated from a rigid material each shell having an upper and lower portion, said upper portion housing a floating material as a floating source and said lower portion housing a weighting material as a source for increasing weight, both ends of each shell being closed,
a plurality of rigid cylindrical bonding members having a diameter smaller than that of the cylindrical shells and penetrating transversely through the cylindrical shells to thereby rigidly bond said shells together so that said shells are arranged parallel to one another,
said upper portion of each shell projecting upwardly and out of the water along its entire length to a height of at least one-half of the average height of waves to be broken,
means for mooring the breakwater to the sea bottom maintaining the shells perpendicular to the direction of wave movement, and
the specific gravity of the breakwater assembly due to the floating material and the weighting material being 0.15 to 0.75.

* * * * *

UNITED STATES PATENT AND TRADEMARK OFFICE
CERTIFICATE OF CORRECTION

PATENT NO. : 3,991,576
DATED : November 16, 1976
INVENTOR(S) : Sadanori TAZAKI et al It is certified that error appears in the above-identified patent and that said Letters Patent are hereby corrected as shown below:

IN THE HEADING:

[75] Inventors: delete "Sandanori Tazaki" and insert -- Sadanori Tazaki --

Signed and Sealed this

Twelfth Day of April 1977

[SEAL]

Attest:

RUTH C. MASON
*Attesting Officer*

C. MARSHALL DANN
*Commissioner of Patents and Trademarks*